Sept. 3, 1946.   E. A. STALKER   2,406,924
AIRCRAFT
Filed May 21, 1943   2 Sheets-Sheet 1

INVENTOR
Edward A. Stalker
By Marschal and Biebel
ATTORNEYS

Sept. 3, 1946. E. A. STALKER 2,406,924
AIRCRAFT
Filed May 21, 1943 2 Sheets-Sheet 2
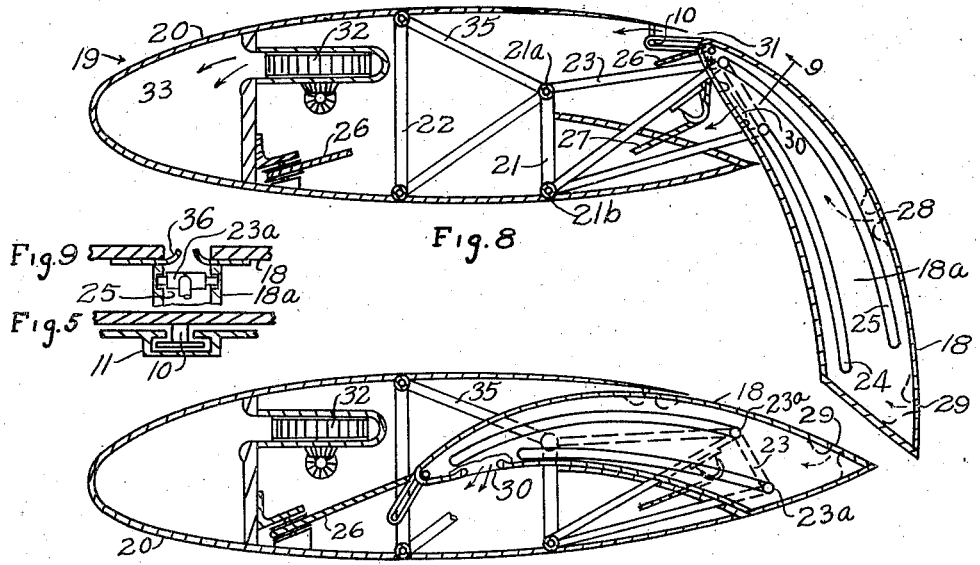
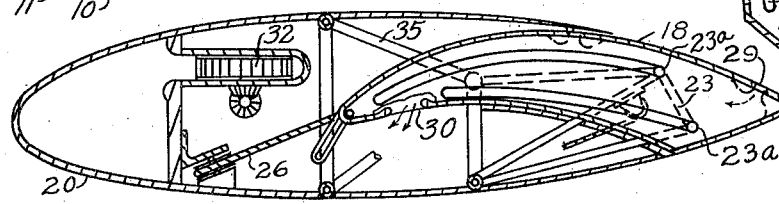
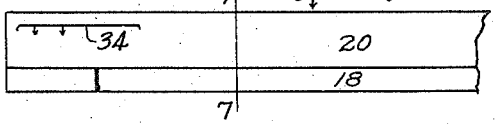
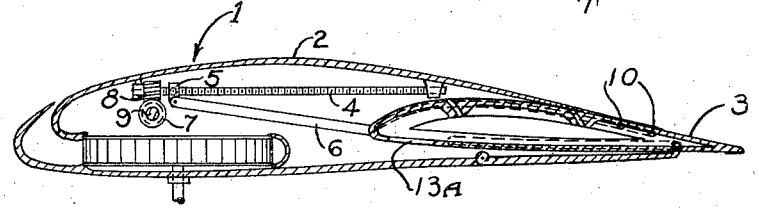
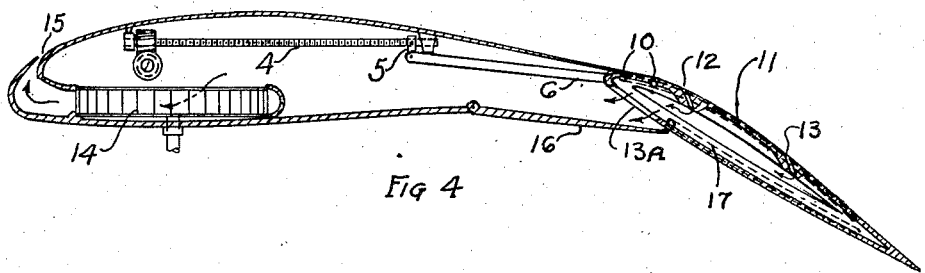
INVENTOR
Edward A. Stalker
By Marechal and Eibel
ATTORNEYS Patented Sept. 3, 1946

2,406,924

UNITED STATES PATENT OFFICE 2,406,924

AIRCRAFT

Edward A. Stalker, Bay City, Mich.

Application May 21, 1943, Serial No. 487,875

8 Claims. (Cl. 244—42)

My invention relates to aircraft wings and in particular to the control of the boundary layer thereof.

It has for its principal object to provide a wing with a flap which is extensible to produce a highly cambered wing on which the boundary layer is controlled in order to secure high lift without high drag.

It is also an object to provide a simple and effective structure for supporting and adjusting such a flap.

This application is in part a continuation of and contains subject matter divided out of my application, Serial No. 313,967, filed January 15, 1940.

I accomplish the above objects by the means illustrated in the accompanying drawings in which—

Fig. 3 is a section along the line 3—3 in Fig. 1;

Fig. 4 is a section along the line 4—4 in Fig. 2;

Fig. 5 is a section along the line 5—5 in Fig. 4;

Fig. 6 is a plan view of the preferred wing;

Fig. 7 is a section along the line 7—7 in Fig. 6;

Fig. 8 is a section along line 7—7 with the flap extended; and

Fig. 9 is a section along line 9—9 in Fig. 8.

Figures 1, 2:
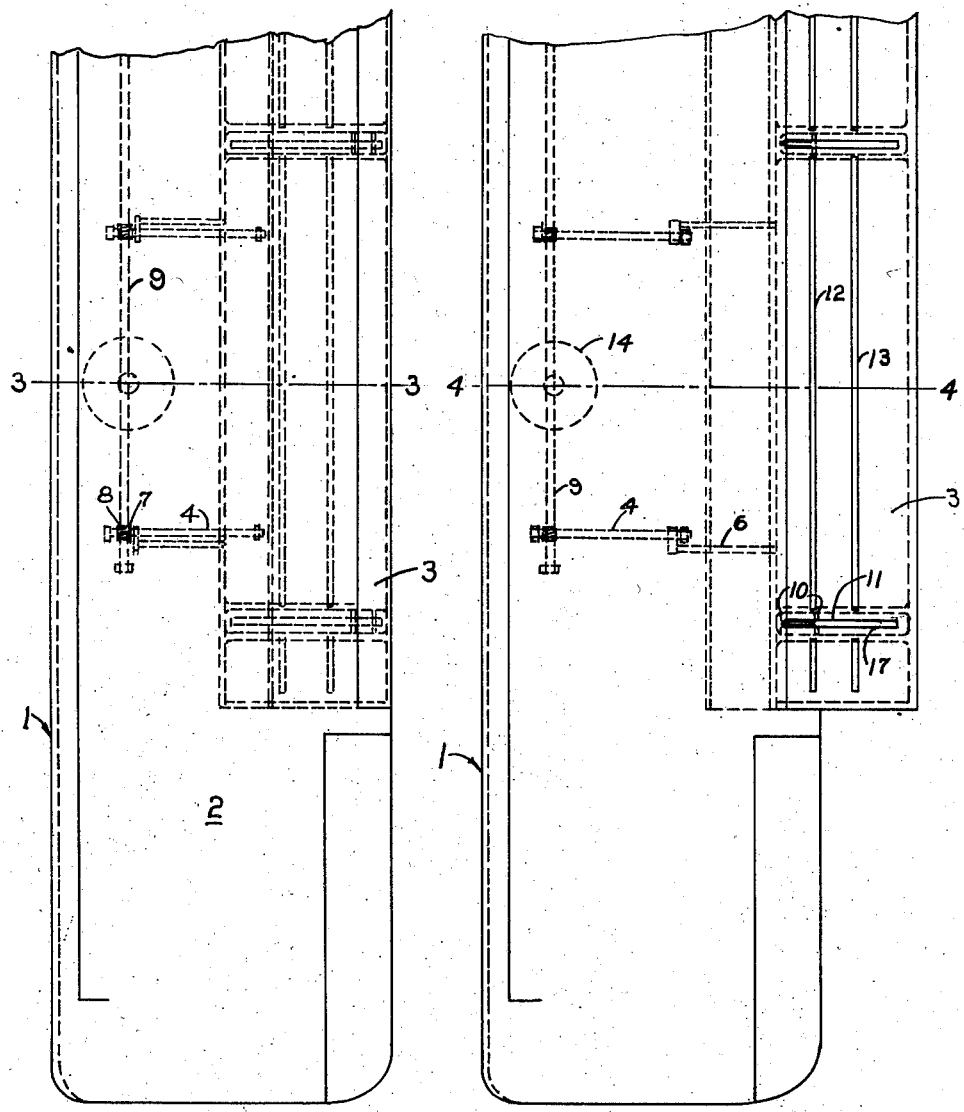
Fig. 1 is a plan view of the preferred wing with the flap retracted.
Fig. 2 is a plan view of the wing with the flap extended.

I have shown in my U. S. Patent No. 1,913,644 how the induction and discharge of fluid through slots in the surface of a wing can increase the maximum lifting capacity. The present application discloses means to increase the effectiveness of wings employing slots.

For high speed it is desirable to use a relatively thin wing of very little or no arching of the mean camber line, but for high lifting capacity it is desirable to have a high arching of the mean camber line. With a thin wing and the conventional flap it is difficult to achieve a high arching and an upper surface free of abrupt changes of curvature. The present invention provides generously curved upper surfaces with a high value of the maximum ordinate of the mean camber line.

Figs. 1 to 5 show a variable area wing 1 comprised of the main body 2 and the extensible flap 3. The flap is housed within the wing in the high speed position and is slid rearward by the screw 4, nut 5 and link 6 articulated to the nut at one end and the flap nose at the other end to the high lift position. The screw is rotated by the helical gears 7 and 8, the former on the shaft 9 under the control of the pilot of the aircraft to which the wing may be fitted.

The wing carries a number of T-lugs 10 which slide in slots 11 in the flap. Viewed in the chordwise section of the wing, the slot is curved. This governs the angular attitude of the flap relative to the wing main body.

The flap has slots 12 and 13 which are exposed when the flap is extended rearward, and closed or shielded by the upper wing surface when retracted. The slots lead into the flap interior which in turn is in communication with the main body interior through opening 13a in the flap nose portion. A blower 14 inducts air through the slots 12 and 13 and discharges it through discharge slot 15 located in advance of the suction slots and preferably adjacent the nose of the wing.

The wing is equipped with the surface flap 16 on the under side to aid in the accommodation of the flap in its process of extension and to close the lower surface of the wing. The tip of this flap also carries a T-lug which rides in a slot 17 in the lower side of the extensible flap.

As shown the flap has an upper curved surface of substantial radius such that in the extended position shown in Fig. 4 the flap provides a wing of high mean camber and of increased area, the upper curved flap surface merging smoothly with the surface of the wing main body and forming a substantially continuous upper curved surface of substantial radii. For a relatively thin wing the radius of curvature of the upper surface of the wing main body is greater than the maximum thickness of the wing as shown. The upper surface of the flap is similarly defined by a curve of a radius greater than the thickness of the wing adjacent the end of the main body, i. e. in the area where the flap is supported from the main body, although such radius may be somewhat less than that of the upper surface of the wing main body.

In the extended position of the flap, the induction slots 12 and 13 are uncovered and operable to provide for induction of the boundary layer on the respective wing surfaces forwardly thereof. In the retracted position of Fig. 3, the flap is in major part nested within the open end portion of the wing main body between the upper and lower surfaces thereof, leaving at most only the rearmost portion thereof exposed and forming the trailing edge of the wing. The flap slots are then closed and rendered ineffective and the wing is highly effective for high speed with low drag.

A further form of the invention is shown in Figs. 6 and 7. The flap 18 adjustably supported on wing 19 is given a large mean camber and a well-rounded upper contour so that when the flap is extended, not only is the wing area increased but the magnitude of the mean camber line of the wing 19 under such conditions is very large, so large in fact that the relative wind will not properly follow the flap surface for even small angles of attack, unless assistance is given in the form of boundary layer control.

The flap is in major part nested between the upper and lower outline of the wing main body 20 with the rear portion of the flap forming the rear portion of the wing. By properly nesting the flap within the recess formed at the end of the wing it is possible to give the flap and the wing the high camber and the radius of curvature previously mentioned.

The flap is supported from the rear spar 21 which is braced to the front spar 22. The rear spar has the upper and lower chord members 21a and 21b. Extending rearward from the rear spar are the trusses 23 spaced along the flap span. These trusses carry at the rear extremes T-lugs 23a which slide in the guide slots 24 and 25 in the flap 18. Such guide slots are spaced from each other and generally parallel with the upper and lower surfaces of the flap, respectively.

The flap is moved by the cables 26 and 27 running over pulleys to a suitable pilot's actuating mechanism, providing respectively for retracting and extending the flap. It will be apparent that the provision of the two T-lugs 23a working at spaced points in the guide slots 24 and 25 provides for rocking the flap concurrently with its retracting and extending movements between the two angularly related positions shown in Figs. 7 and 8 and also for securing the same against undesired movement in any adjusted position. Such angular or rocking movement is important in providing for the flap remaining within the confines of the upper and lower wing surfaces as it travels from one position to the other.

The flap has the slots 28 and 29 in its surface in communication with the interior of the wing main body through the opening 30 located adjacent the forward portion of the flap. There is also a slot 31 formed between the wing main body and the nose of the flap which is enlarged and made effective when the flap is extended. Thus the blower 32 is enabled to induce a flow through the slots 28, 29 and 31 into the wing interior to control the boundary layer on the wing. The blower discharges the inducted air into the duct 33 and out the slot 34 which is located forwardly and preferably on the upper surface of the wing main body as shown in Fig. 7.

It will be noted that in this embodiment, slot 29, the rearmost slot in the upper surface of flap 18, is not covered over in the retracted or nested position of the flap, but remains operative to afford boundary layer control in the high speed position of the wing.

The upper surface of the nose of the flap is slotted chordwise to accommodate the spar bracing struts 35 and permit the flap leading edge to penetrate further into the wing. Fig. 9 shows a section through the nose upper surface. The seals 36 are of spring material so that they tend to close together maintaining a smooth outer surface and preventing loss of air when the member 35 has passed by.

The wing is also slotted at the bottom to accommodate the lower member of the truss 23. This slot may be sealed in the same manner as the upper slot as shown in Fig. 9. The slots 24 and 25 are also closed at the bottom to prevent leakage of air through them into the flap interior. These slots are in the opposite walls of box ribs 18a.

The rear upper surface of the wing is supported by a T-lug 10 sliding in a slot in a different chord plane from the rib 18a. Only a part of this slot structure is shown at 10 in Fig. 8 ahead of the flap nose. The slot extends back along the flap.

It is a feature of this invention that the flap is equipped with two tracks, each moving on a separate guide lug or mating part. This construction makes it possible for the flap to follow such a course that it stays within the upper and lower surfaces of the wing main body.

The nesting of the flap above the upper chord member of the rear spar is a feature of this invention. This position is advantageous structurally because it gives adequate bracing between the upper and lower chord members. It is advantageous aerodynamically because it permits the exposition of a part of the upper surface of the flap so that a slot is available for reducing the drag during high speed flight.

The invention thus provides a highly satisfactory means of increasing the wing area by a flap which confers upon the resulting wing a very high camber, which is also retractable within the outline of the wing section so that the drag for high speed flight is low.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A wing structure comprising a wing forebody having an upper and a lower airfoil surface and an open end portion, the upper surface of said body being defined by a curve of a radius longer than the maximum thickness of the wing, a lift flap having an upper surface defined by a curve of a radius greater than the thickness of the wing adjacent the end of said main body, means for mounting said flap at the end of said forebody providing for adjustment in the relative position thereof from a retracted high-speed position to a lowered high-lift position at a substantial angle with respect to said forebody, said flap in the high-speed position being in major part nested within said open end portion between the upper and lower surfaces thereof, said flap in the high-lift position having its nose adjacent the end of said forebody exposing said curved upper surface thereof to provide a substantially continuous upper-curved surface for said combined wing and flap of substantial radii, said upper curved surface of the flap having a slot therein in communication with the interior thereof, means within the wing forebody establishing communication with the interior of the flap and with said slot, and means for causing a flow of air through said slot to increase the velocity of air flow in the boundary layer on said upper curved surface.

2. A wing structure comprising a wing forebody having an upper and a lower airfoil surface and a recessed end portion, a lift increasing device, means for mounting said device at the end of said forebody providing for adjustment in the relative position thereof, means for adjusting said device from a high-speed position in which the major portion of said device is received within said recessed end between the upper and lower surfaces of said forebody to a high-lift position in which a major portion of said device is exposed at the end of said forebody forming a smooth continuous upper-surface curve extending from the junction of said forebody and said device to the exposed end of said device, the radius of curvature of said exposed portion between the nose arc and the trailing edge being less than the radius of the adjacent upper surface of said forebody and substantially greater than the thickness of the adjacent end of said forebody, means forming a slot in the upper exposed curved surface of said device, means establishing communication between the slot in said device and the wing interior, and blower means within the wing to induce a flow of fluid through said slot to cause the relative wind to follow the wing surface.

3. A wing structure comprising a wing forebody having an upper and a lower airfoil surface and an open end portion, the upper surface of said body being defined by a curve of a radius longer than the maximum thickness of the wing, a lift flap having an upper surface defined by a curve of a radius greater than the thickness of the wing adjacent the end of said main body, means for mounting said flap at the end of said forebody providing for adjustment in the relative position thereof from a retracted high-speed position to a lowered high-lift position at a substantial angle with respect to said forebody, said flap in the high-speed position being in major part nested within said open end portion between the upper and lower surfaces thereof, said flap in the high-lift position having its nose adjacent the end of said forebody exposing said curved upper surface thereof to provide a substantially continuous upper curved surface for said combined wing and flap of substantial radii, said upper curved surface of the flap having a slot therein, means establishing communication between the slot in said device and the interior of the wing, and means within the wing for causing a flow of air through said slot to increase the velocity of air flow in the boundary layer on said upper-curved surface, said device when within the recess having a slot exposed for the induction of the boundary layer to reduce the wing drag.

4. A wing structure comprising a wing forebody having an upper and a lower airfoil surface and a recessed end portion, a lift increasing flap, means for mounting said flap at the rear end of said forebody providing for adjustment in the relative position thereof, means for adjusting said flap from a high-speed position in which said device is received within said recessed end between the upper and lower surfaces of said forebody to a high-lift position in which a major portion of said flap is exposed at the end of said wing forming a highly cambered wing, said means for mounting including a plurality of contact elements supported in vertical spaced relation on said forebody, said flap having a plurality of chordwise tracks spaced vertically each bearing on one of said contact elements to guide the flap in chordwise motion and in vertical rotation relative to said forebody while being adjusted between said high-speed and said high-lift positions.

5. A wing structure comprising a wing forebody having an upper and a lower airfoil surface and a recessed end portion, a lift-increasing flap, means for mounting said flap at the rear end of said forebody providing for adjustment in the relative position thereof, means for adjusting said flap from a high-speed position in which said device is received within said recessed end between the upper and lower surfaces of said forebody to a high-lift position in which a major portion of said device is exposed at the end of said wing, and a wing beam in the wing extending spanwise thereof with its upper chord member spaced below the upper surface of said forebody and below the upper surface of said flap in the recessed position.

6. A wing structure comprising a wing forebody having an upper and a lower airfoil surface and a recessed end portion, a lift-increasing flap, means for mounting said flap at the end of said forebody providing for adjustment in the relative position thereof, means for adjusting said flap from a high-speed position in which the major portion of said flap is received within said recessed end between the upper and lower surfaces of said forebody to a high lift position in which a major portion of said flap is exposed at the end of said forebody forming a smooth continuous upper surface curve extending from the junction of said forebody and said flap to the exposed end of said flap, said adjusting means directing said flap rearward and downward maintaining the lower surface of said flap in close relationship to the rear edge of the lower surface of said forebody to effectively seal the wing interior from the air region below the wing, means forming a slot in the upper exposed curved surface of said flap, means establishing communication between said slot and said interior of said wing forebody, and blower means within the wing forebody in communication with said interior to induce a flow of fluid through said slot to cause the relative wind to follow the wing surface.

7. A wing structure comprising a wing forebody having an upper and a lower airfoil surface and a recessed end portion, a lift-increasing flap having an air flow passage therethrough, means for mounting said flap at the end of said forebody providing for adjustment in the relative position thereof, means for adjusting said flap from a high-speed position in which the major portion of said flap is received within said recessed end between the upper and lower surfaces of said forebody to a high-lift position in which a major portion of said flap is exposed at the end of said forebody forming a smooth continuous upper surface curve extending from the junction of said forebody and said flap to the exposed end of said flap, means forming a slot in the upper exposed curved surface of said flap in communication with said air flow passage, means defining an opening in the lower forward surface of said flap to establish communication between said forebody interior and said flap interior, blower means within the wing in communication with said slot through said opening to induce a flow of fluid through said slot to cause the relative wind to follow the wing surface, said opening in the flap lying wholly within the forebody between the upper and lower surfaces thereof.

8. A wing structure comprising a wing forebody having an upper and a lower airfoil surface and a recessed end portion, a lift-increasing flap, means for mounting said flap at the end of said forebody providing for adjustment in the relative position thereof, means for adjusting said flap for movement in translation from a retracted high speed position in which the major portion of said flap is received within said recessed end between the upper and lower surfaces of said forebody to an extended high lift position in which a major portion of said flap is exposed at the end of said forebody forming a smooth continuous upper surface curve extending from the junction of said forebody and said flap to the exposed end of said flap, means adjustably supporting the rear portion of the upper surface of said forebody on said flap, means forming a slot in the upper exposed curved surface of said flap, means establishing communication between said slot and the wing interior, and blower means within the wing to induce a flow of fluid through said slot to cause the relative wind to follow the wing surface.

EDWARD A. STALKER.